(No Model.)

A. C. LAMBETH.
RIDING SADDLE.

No. 328,232. Patented Oct. 13, 1885.

WITNESSES:
Th. Rolle.
W. F. Aurcher

INVENTOR:
Alex. C. Lambeth
BY
ATTORNEY.

N. PETERS, Photo-Lithographer, Washington, D. C.

UNITED STATES PATENT OFFICE.

ALEXANDER C. LAMBETH, OF DENVER, COLORADO, ASSIGNOR TO SAMUEL W. LAMBETH, OF PHILADELPHIA, PENNSYLVANIA.

RIDING-SADDLE.

SPECIFICATION forming part of Letters Patent No. 328,232, dated October 13, 1885.

Application filed June 8, 1885. Serial No. 167,923. (No model.)

*To all whom it may concern:*

Be it known that I, ALEXANDER C. LAMBETH, a citizen of the United States, residing at Denver, in the county of Arapahoe, in the State of Colorado, have invented a new and useful Improvement in Riding-Saddles, which improvement is fully set forth in the following specification and accompanying drawings, in which—

Figure 1:
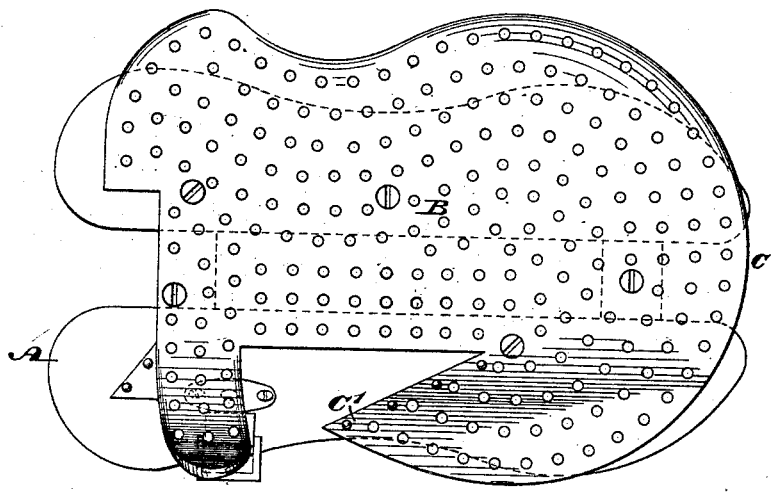
Figure 2:
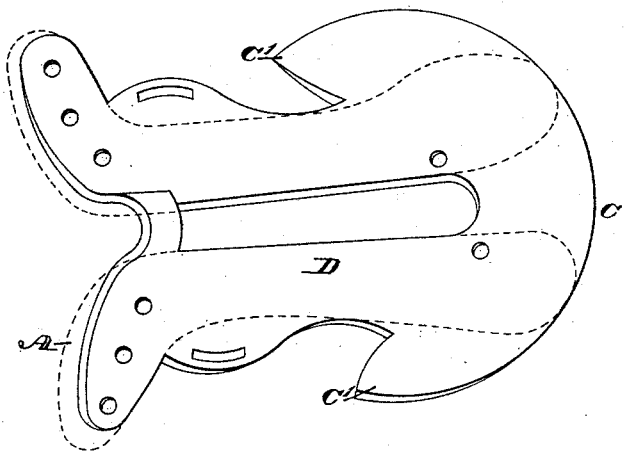

Figure 1 represents a top or plan view of a tree for a lady's saddle embodying my invention. Fig. 2 represents a perspective view of a tree for a gentleman's saddle embodying my invention.

Similar letters of reference indicate corresponding parts in the two figures.

My invention consists of a saddle-tree having the sides of the cantle constructed to provide supports for the legs of the rider and thus increase the comfort thereof.

It also consists of the combination of parts forming an improvement in saddle trees.

Referring to the drawings, A represents the tree of a saddle, and B represents a deck secured thereto.

The deck is constructed of metal, leather, or other suitable material formed into shape according to the pattern desired—such as English, Spanish, stock, military, &c.

The cantle C is extended laterally, as at C'—on one side for a lady's saddle, and on both sides for a gentleman's saddle—the front end of the extension C' being bent down and secured to the tree.

It will be seen that the extension conforms to the shape of the under part of the leg, and serves to throw out and raise the same in such manner as to form a broad support therefor, instead of allowing the leg to carry the most of its own weight and press itself directly inward and downward against the side of the deck or tree.

The deck is provided with a horn, and shown perforated, the deck, horn, and extension C' being formed of one piece of metal or material, whereby a strong and light device is produced, avoiding joints and fastening-screws, rivets, &c., for connecting the several parts with the heads of such fastenings when employed, projecting, so as to wear, which objectionable feature is avoided by me.

Having thus described my invention, what I claim as new, and desire to secure by Letters Patent, is—

1. In a saddle, a perforated deck having a horn and a cantle provided with a lateral extension, said parts being integral, substantially as described.

2. In a saddle, a perforated deck having a horn and a cantle provided with a lateral extension, said parts being integral, and the said lateral extension having its front end bent down and secured to the tree of the saddle, substantially as described.

3. In a saddle, a tree, in combination with a perforated deck having a horn, a cantle, and a lateral extension of the said cantle, said deck, horn, cantle, and extension being integral, and said extension having its front end bent down and secured to the said tree, substantially as described.

ALEXANDER C. LAMBETH.

Witnesses:
J. G. TESCH,
FRANK S. TESCH.